(12) United States Patent
Johansson et al.

(10) Patent No.: US 9,847,153 B2
(45) Date of Patent: Dec. 19, 2017

(54) POWER CABLE ASSEMBLY DEVICE AND A POWER CABLE PROVIDED WITH SUCH A DEVICE

(71) Applicant: ABB HV Cables (Switzerland) GmbH, Baden (CH)

(72) Inventors: Lisa Johansson, Ronneby (SE); Flemming Krogh, Jämjö (SE)

(73) Assignee: ABB HV Cables (Switzerland) GmbH, Baden (CH)

( * ) Notice: Subject to any disclaimer, the term of this patent is extended or adjusted under 35 U.S.C. 154(b) by 0 days.

(21) Appl. No.: 15/108,723

(22) PCT Filed: Jan. 21, 2014

(86) PCT No.: PCT/EP2014/051145
§ 371 (c)(1),
(2) Date: Jun. 28, 2016

(87) PCT Pub. No.: WO2015/110148
PCT Pub. Date: Jul. 30, 2015

(65) Prior Publication Data
US 2016/0320579 A1    Nov. 3, 2016

(51) Int. Cl.
*G02B 6/44* (2006.01)
*H01B 9/00* (2006.01)
(Continued)

(52) U.S. Cl.
CPC ........... *H01B 9/005* (2013.01); *G02B 6/4417* (2013.01); *G02B 6/4427* (2013.01); *G02B 6/506* (2013.01);
(Continued)

(58) Field of Classification Search
CPC ............................ G02B 6/4417; G02B 6/4419
See application file for complete search history.

(56) References Cited

U.S. PATENT DOCUMENTS 5,687,271 A * 11/1997 Rabinowitz .......... G02B 6/4416
174/68.1
7,936,952 B2 * 5/2011 Jang ........................ H01B 12/02
385/12
(Continued)

FOREIGN PATENT DOCUMENTS

DE    19508888 A1    9/1996
GB    2035599 A    6/1980
(Continued)

OTHER PUBLICATIONS

Machine translation of JP 2007-073519.*
(Continued)

*Primary Examiner* — Chris Chu
(74) *Attorney, Agent, or Firm* — Whitmyer IP Group LLC

(57) ABSTRACT

A power cable assembly device adapted to be arranged in the spaces between neighboring power cores of a power cable. The power cable assembly device includes an extruded profiled body made of a polymer material having a first, second, and third walls. The first wall being convex and having an exterior surface adapted to face a jacket of the power cable. The profiled body also having a chamber wall extending from the second to the third wall, defining a slit and adapted to receive a fiber optic cable.

21 Claims, 7 Drawing Sheets

(51) Int. Cl.
    *G02B 6/50*     (2006.01)
    *H02G 9/02*     (2006.01)
    *H01B 7/18*     (2006.01)
    *H02G 9/04*     (2006.01)

(52) U.S. Cl.
    CPC ............. *H01B 7/1895* (2013.01); *H02G 9/02* (2013.01); *G02B 6/4459* (2013.01); *H02G 9/04* (2013.01)

(56) References Cited

U.S. PATENT DOCUMENTS

| | | |
|---|---|---|
| 2010/0122844 A1 | 5/2010 | Efraimsson et al. |
| 2012/0145453 A1 | 6/2012 | Temple et al. |
| 2012/0205137 A1 | 8/2012 | Fjellner et al. |

FOREIGN PATENT DOCUMENTS

| | | |
|---|---|---|
| SE | 0601826 L | 3/2006 |
| SE | 530277 C2 | 4/2008 |

OTHER PUBLICATIONS

International Preliminary Report on Patentability Application No. PCT/EP2014/051145 dated May 19, 2016 6 pages.
International Search Report and Written Opinion of the International Searching Authority Application No. PCT/EP2014/051145 Completed: Sep. 11, 2014; dated Sep. 22, 2014 9 pages.
Written Opinion of the International Preliminary Examining Authority Application No. PCT/EP2014/051145 dated Dec. 15, 2015 4 pages.
Office Action from Japan and Translation Application No. 2016-564383 dated Feb. 24, 2017 6 pages.

\* cited by examiner

POWER CABLE ASSEMBLY DEVICE AND A POWER CABLE PROVIDED WITH SUCH A DEVICE

TECHNICAL FIELD

The present invention relates to a power cable assembly device adapted to be arranged in the spaces between neighbouring power cores of a power cable. It also relates to a power cable comprising such a power cable assembly device.

BACKGROUND

When putting a power cable in the ground, or on the sea floor, it is often practical to add a fibre optic cable in a space between the power cores.

A power cable assembly device and a power cable including a fibre optic cable are known from SE-C2-530 277. The known assembly device however suffers from inefficient equalisation of electric potential between the power cable and the fibre optic cable.

According to DE-A1-195 08 888 A1, the fibre optic cable is put inside a metal tubing placed at two of the power cores with the intention to provide contact between the metal tubing and the outer conductive plastic material of the power core, in order to equalize the electric potential between the power core and the metal tubing.

The object is to provide a power cable assembly device and a power cable, which is possible to test on land without risking that the fibre optic cable is damaged when testing or operating the power cable.

Another object is to provide a power cable assembly device and a power cable subjected to an insufficient flow with sea-water intended to equalize the electric potential between the fibre optic cable and the power cores, without risking that the fibre optic cable is damaged when testing or operating the power cable.

A further object is to provide a power cable assembly device and a power cable, which is designed such that the fibre optic cable is not damaged when testing the power cable, even if not being on the same electric potential.

Another object is to facilitate easy introduction of the fibre optic cable through the slit into the chamber.

SUMMARY

This object has been achieved by a power cable assembly device adapted to be arranged in the spaces between neighbouring power cores of a power cable, comprising an extruded profiled body made of a polymer material and adapted to the cross-sectional shape and elongation of the power cable, said profiled body comprising a first wall, a second wall and a third wall, said first wall being convex and having first and second opposite end portions, the first wall having an exterior surface adapted to face a jacket of the power cable, said profiled body further comprising a chamber wall extending from said second wall to said third wall, said chamber wall having an interior surface defining a chamber, said profiled body defining a slit between said second wall and said third wall to said chamber, said chamber being adapted to receive a fibre optic cable via said slit, wherein at least a portion of said interior surface and at least a portion of said exterior surface is provided with a semi-conductive material, respectively, said interior surface and said exterior surface being electrically interconnected by said semi-conductive material.

Hereby is achieved an improved equalisation of the electric potential between the metallic parts of the power cable and the metallic parts of the fibre optic cable.

Moreover, easy introduction of the fibre optic cable into the chamber of the slit is achieved, since no semi-conductive material is provided in the slit, said semi-conductive material having a higher friction than the material of the rest of the assembly device.

The object has also been achieved by a power cable as initially defined, the power cable assembly devices being arranged in the spaces between neighbouring power cores, at least one of said power core assembly devices containing a fibre optic cable introduced via said slit.

Suitably, at least a portion of the surface of the chamber for the fibre optic cable is provided with an interior layer of said semi-conductive material; at least a portion of the exterior surface of the first wall facing said jacket is provided with an exterior layer of said semi-conductive material; said interior and exterior layers being interconnected.

Preferably, the interior layer of said chamber wall and the exterior layer of said first wall are interconnected via a connecting layer of semi-conductive material extending from the chamber surface to the exterior surface at least via the chamber wall and said first wall.

Suitably, the chamber wall and the first wall define together a peripheral portion of the chamber.

Preferably, said first wall and said chamber wall are interconnected via a reinforcement wall, said connecting layer extending from the chamber surface of the chamber wall to the exterior surface of said first wall via said reinforcement wall.

In particular, the thickness of said connecting layer is in the range 0.01-0.5 mm, more preferably 0.05-0.35 mm, even more preferably 0.1-0.3 mm, even more preferably 0.15-0.25 mm, most preferably 0.2 mm.

Alternatively, or in addition the thickness of at least one of said interior layer and exterior layer is in the range 0.01-0.5 mm, more preferably 0.05-0.35 mm, even more preferably 0.1-0.3 mm, even more preferably 0.15-0.25 mm, most preferably 0.2 mm.

Hereby, a low consumption of the additive of the semi-conductive material is achieved during manufacture of the assembly device and thus a less expensive production method of the assembly device.

Alternatively, the semi-conductive material extends substantially homogenously through the first wall from said exterior surface to said interior surface, or vice versa.

Hereby is achieved an even more improved potential equalisation.

Preferably, the wall thickness of the first wall is in the range of 2-6 mm, more preferably 2.5-4 mm, most preferably 3 mm.

Suitably, the wall thickness of the chamber wall is in the range of 2-6 mm, more preferably 2.5-4 mm, most preferably 3 mm.

Preferably, the cross-section of the chamber is substantially annular, such as circular or oval. Alternatively, or in addition, the cross-section of the chamber is elongated, such as oval or rectangular, in a radial direction of the curve radius of the convex first wall.

Hereby, an optimal shape of the chamber is achieved.

Preferably, said second wall is concave and has third and fourth opposite end portions, said third wall being concave and having fifth and sixth end portions, the third end portion of said second wall being connected to said first end portion of said first wall, the fifth end portion of said third wall being connected to said second end portion of the first wall, said second and third walls being adapted to face a pair of neighbouring power cores, wherein the fourth end portion of the second wall and the sixth end portion of the third wall define together said slit to said chamber inside said profiled body, said slit extending in the elongation of the profile for allowing introduction of a fibre optic cable into said chamber. Hereby, the profiled body is further defined.

The combination of the fact that the material used is watertight and that the slit is closed, no or only small amounts of water will circulate in the chamber, which makes the need for an efficient equalisation of the electric potential even more important, since no or little contribution for this purpose is achieved by water.

Preferably, the profiled body is made of a polymer material, such as PVC or PE.

Suitably, the semi-conductive material comprises a mixture of a polymer material, such as PVC or PE, and an additive, such as carbon black.

Hereby is achieved a cost-efficient semi-conductive material with excellent mechanical and blending and connection properties in relation to the material of the rest of the profiled body.

Preferably, the concavity of the outer surface of the second and third walls, respectively, is adapted to the number of power cores and the diameter of the power cores. Hereby, a tight fit will be achieved between the assembly profile and neighbouring power cores, and the power cores and the profiles will form a power cable with a substantially circular cross-section with high mechanical stability.

Suitably, the convexity of the outer surface of the first wall is adapted to an imaginary circle inscribed through a peripheral point of each power core in relation to the diametrical centre point of the power cable.

Hereby is achieved a power cable with large form stability when assembled, i.e. the cross-section of the assembled power cable will be substantially circular also at the high radial pressure during cable laying from vessels.

Preferably the first wall faces a jacket of the power cable, said second and third walls face a pair of neighbouring power cores, at least one of said assembly devices containing said fibre optic cable.

Hereby is achieved a power cable with a cross-section of high stability and high strength, and is thus able to mechanically protect the fibre optic cable.

Suitably, the concavity of the second and the third walls, respectively, is adapted to the number of power cores and the diameter of the power cores.

In addition, or alternatively, the convexity of the first wall is adapted to an imaginary circle inscribed through a peripheral point of each power core in relation to the diametrical centre point of the power cable.

Hereby is achieved a power cable with substantially circular cross-section reducing the risks for deformation of the cable, due to unwanted movements during laying and handling of the power cable, such unwanted movements causing e.g. kinks.

Preferably, wherein the number of power cores is three and the number of power cable assembly devices is three, and wherein the diameter of each power core is in the range 30-140 mm, more preferably 40-130 mm, even more preferably 50-120 mm.

Hereby is achieved a cable optimised for a predetermined voltage level and for a predetermined ampacity.

BRIEF DESCRIPTION OF THE DRAWINGS

In the following, the invention will be described in more detail by reference to the enclosed drawings, in which

FIG. 1b is a cross-section of the interior of a power cable provided with the power cable assembly device shown in FIG. 1a;

FIG. 3b is a cross-section of the interior of a power cable provided with the power cable assembly body shown in FIG. 3a;

FIG. 5a is a cross-section of a variant of the power cable assembly device shown in FIG. 3a;

FIG. 5b is a cross-section of a variant of the power cable assembly device shown in FIG. 5a;

DETAILED DESCRIPTION

Figure 1A:
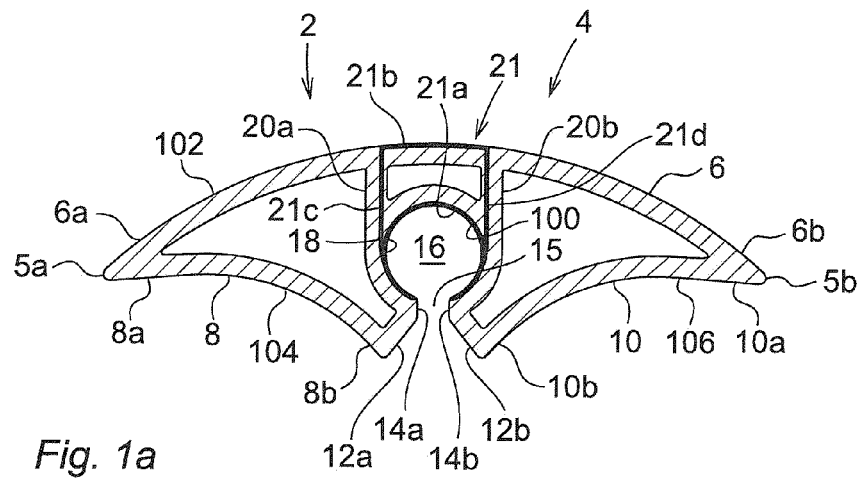
FIG. 1a is a cross-section of a power cable assembly device provided with a semi-conductive layer according to a first embodiment of the invention.

FIG. 1a shows a power cable assembly device 2 in the form of an extruded profiled body 4 with a first wall 6, a second wall 8, a third wall 10. The first wall 6 is convex while the second and third walls 8, 10 are concave, the reason for which will be discussed farther below. The cross-section of the profiled body has first and second end portions 5a, 5b, opposite to one another.

The first wall 6, having an exterior surface 102 has a first end 6a and a second end 6b. Likewise, the second wall 8, having an outer surface 104 has a first end 8a and a second end 8b. Correspondingly, the third wall 10, having an outer surface 106 has a first end 10a and a second end 10b. The first end 6a of the first wall 6 is connected to the first end 8a of the second wall at the first end 5a, while the second end 6b of the first wall 6 is connected to the first end 10a of the third wall 10 at the second end 5b of the profiled body 4.

The second end 8b of the second wall 8 continues to a first angled transition 12a and further to a first radial transition 14a. Likewise, the second end 10b of the third wall 10 continues to a second angled transition 12b and further to a second radial transition 14b.

The first and second angled transitions 12a, 12b are converging towards the first and second radial transitions 14a, 14b, the latter being substantially parallel to one another and thus substantially radial to the convex first wall 6.

According to this embodiment, the first and second radial transitions 14a, 14b are arranged at a distance from one another, defining an open slit 15.

Inside the profiled body 4, a chamber 16 is defined by a substantially annular wall 18, having an interior surface 100. The annular wall 18 is arranged at a distance from the first wall 6 and extends from the first radial transition 14a to the second radial transition 14b. A first and a second reinforcement wall 20a, 20b is arranged between the annular wall 18 and the first wall 6, respectively. Of course, the number of reinforcement walls could be less than two, i.e. one, or more than two, i.e. three, four, five or even more, depending on the space available between the circumferential walls and requirements regarding radial strength.

The assembly device 2 is made by extrusion of a polymer material, such as PE (e.g. MDPE or HDPE) or PVC and may have a length of several kilometers.

The interior surface 100 of the annular wall 18 of the chamber 16 is provided with, or is constituted by a thin interior layer 21a of semi-conductive material 21. Likewise, the exterior surface 102 of the first wall 6 is provided with, or is constituted by a thin exterior layer 21b of semi-conductive material 21.

The thin interior and exterior layers 21a, 21b of semi-conductive material 21 are interconnected by a thin connecting layer 21c of semi-conductive material 21, extending from the interior layer 21a on the inner surface 100 of the chamber's 16 annular wall 18, further via the lateral extension of the annular wall 18, the reinforcement wall 20a and the lateral extension of the first wall 6 to the exterior layer 21b on the exterior surface 102 of the first wall 6.

In a corresponding manner, a further thin connecting layer 21d of semi-conductive material extends from the interior layer 21a via the reinforcement wall 20b to the exterior surface 102 of the first wall 6.

The thin layer 21a-21d of semi-conductive material 21 is produced by mixing an additive, such as carbon black, and a polymer material (such as MDPE, HDPE or PVC). The polymer material for the profiled body as such and the semi-conductive material for the thin layer 21a-21d are then supplied via different mouthpieces during a co-extrusion process, the supply of the semi-conductive material 21 thus forming the thin layer 21a-21d, while the supply of the polymer material is forming the rest of the profiled body 4.

The thickness of the thin layer 21a-21d of the semi-conductive material 21 is in the range 0.01-0.5 mm, more preferably 0.05-0.35 mm, even more preferably 0.1-0.3 mm, even more preferably 0.15-0.25 mm, most preferably 0.2 mm.

The function of the layer 21a-21d of semi-conductive material 21 will be explained farther below.

It should be noted that it would be possible to provide solely the first reinforcement wall 20a with a thin connecting layer of semi-conductive material 21, i.e. not to provide the second reinforcement wall 20b with such a layer.

Figure 1B:
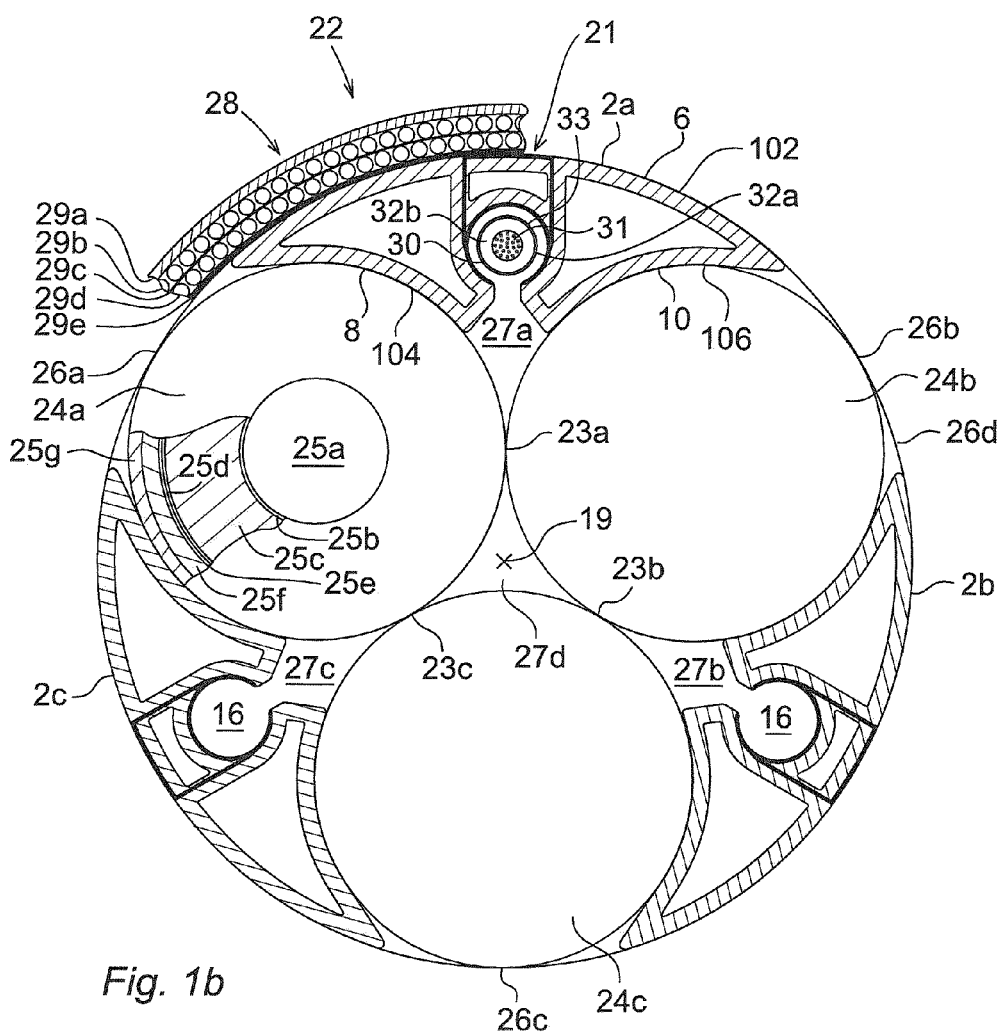

FIG. 1b shows the interior of a power cable 22 provided with three neighbouring first, second and third power cores 24a, 24b, 24c, each provided—from the centre to the periphery—with a conductor 25a, a central semi-conductive layer 25b, insulation 25c, an intermediate semi-conductive layer 25d, a layer of swelling material 25e, a metal screen 25f made of lead or a welded or glued sheath of metal, such as aluminium and a peripheral semi-conductive mantle 25g.

The central and intermediate semi-conductive layers 25b, 25d form a smooth surface towards the insulation 25c which controls the electric field strength. The swelling material 25e tightens against water in case of penetration through the lead screen 25f.

Each power core 24a, 24b, 24c has a peripheral point 26a, 26b, 26c in relation to the diametrical centre 19 of the power cable 22, i.e. in the central space 27d. The three peripheral points 26a, 26b, 26c form together in relation to the centre point 19 an imaginary circle 26d.

The first and second power cores 24a, 24b touch one another at a contact point 23a and define a peripheral space 27a together with the imaginary circle 26d. Likewise, the second and third power cores 24b, 24c have a contact point 23b and define a second peripheral space 27b together with the imaginary circle 26d and the third and first power cores 24c and 24a have a contact point 23c and define a third peripheral space 27c together with the imaginary circle 26d. The first, second and third power cores 24a, 24b, 24c define between the contact points 23a, 23b, 23c a central space 27d.

In the peripheral space 27a, a first assembly device 2a is provided. Likewise, a second assembly device 2b is arranged in the second peripheral space 27b, and a third assembly device 2c is arranged in the third peripheral space 27c.

The power cable is provided with a jacket 28 to keep the power cores 24a, 24b, 24c and the assembly devices 2a, 2b, 2c together as one unit and to keep the circular cylindrical shape and provide mechanical protection and tensile strength. The jacket 28 comprises—from the periphery towards the centre point 19—two layers 29a of yarn made of polypropylene (PP) or a mantle of extruded polyethylene (PE), a first steel wire armour layer 29b, a first protective layer 29c of semi-conductive laying bands, a second steel wire armour layer 29d, a second protective layer 29e of semi-conductive laying bands. The first and second layers 29c, 29e are relatively soft.

It should be noted that the layers 29b and 29c may be omitted, depending on predetermined requirements of mechanical properties of the power cable, i.e. tensile strength during cable laying and mechanical protection against impact and abrasion, also on sea bottom.

For corresponding reasons, the number of layers of steel wire armour 29b, 29d and laying bands 29c, 29e may be more than what is shown in FIG. 1b.

As can be understood from FIG. 1b, the concavity of the outer surface 104, 106 of the second and third walls 8, 10, respectively of each assembly device 2a, 2b, 2c depends on the diameter of the power cores 24a, 24b, 24c. In the same manner, the convexity of the exterior surface 102 of the first wall 6 of each assembly device 2a, 2b, 2c depends on the radius of curvature of the imaginary circle 26d.

An elongated fibre optic cable 30 comprises a fibre optic wave conductor 31, i.e. a bundle of optical fibres inside a metal tubing 32a together with a filling 32b, such as a gel. The metal tubing 32a is covered with a layer of semi-conductive material 33. The fibre optic cable 30 is put inside the chamber 16 of assembly device 2a.

The fibre optic cable 30 may alternatively be manufactured without a filler. Furthermore, it may be manufactured with other kinds of reinforcement covers.

In order to avoid building up of an electric potential between the fibre optic cable 30 and the metallic parts of the power cable 22, it is important that a sufficient electrical contact is established between the semi-conductive layer 33 of the metal tubing 32a of the fibre optic cable 30 and the metal screen 25f of the power core 24a, 24b, 24c as well as the armour layers 29b, 29d. This is performed during assembly first by introducing the fibre optic cable 30 into the chamber 16. The thin interior layer 21a of semi-conductive material 21 of the thickness range presented above extends about the interior surface 100 of the annular wall 18. Thus, a contact to the thin interior layer 21a of semi-conductive material 21 will be established disregarding which part of the annular wall 18 is contacted by the fibre optic cable 30.

Then the concave second and third walls 8, 10 of the assembly devices 2a-2c are mounted against the power cores 24a-24c, and in order to keep them in place, the layers 29e, 29d, 29c, 29b and 29a are mounted outside the power cores and the assembly devices 2a-2c.

Furthermore, owing to the fact that the thin layer 21a-21d of semi-conductive material 21 extends from the chamber 16, to the exterior surface 102 of the first wall 6, electric contact will be established with the second layer 29e of semi-conductive laying bands, and consequently also with the second steel armour layer 29d, the first layer 29c of semi-conductive laying bands and the first steel armour layer 29b.

In turn, electric contact is established between the second layer 29e of semi-conductive laying bands, the armour layers 29b, 29d and the power cores 24a, 24b, 24c at their peripheral points 26a, 26b, 26c, constituting contact points, via the peripheral semi-conductive mantle 25g to the metal screen 25f of each power core 24a, 24b, 24c.

Consequently, the risk for a building up of an electric potential between the fibre optic cable 30 and any one of the power cores 24a-24c or any other surrounding metallic parts, such as the armour layers 29b, 29d is avoided.

Of course, this relates correspondingly to the case when a fibre optic cable is put inside the chamber of the assembly devices 2b and/or 2c.

Figure 2:
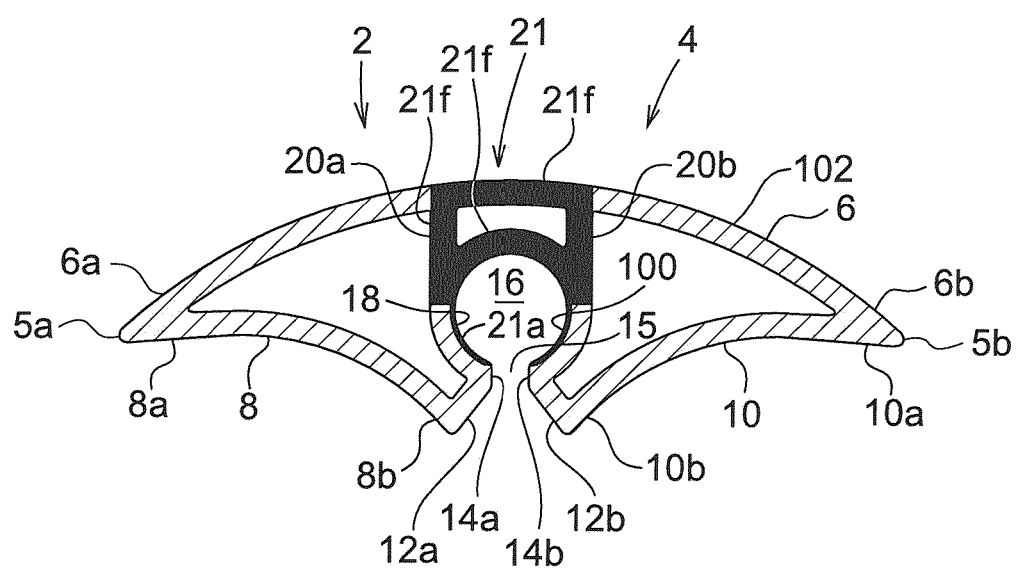
FIG. 2 is a cross-section of a variant of the power cable assembly device shown in FIG. 1a with an alternatively configured semi-conductive layer.

FIG. 2 shows a variant of the power cable assembly device 2, according to which the reinforcement walls 20a, 20b as well as the first wall 6 between the reinforcement walls are at least partly, but are preferably constituted by a homogenous wall 21f of semi-conductive material. Furthermore, the wall 18 defining the chamber 16 is at least partly, but is preferably constituted by a homogenous wall 21f of semi-conductive material between the reinforcement members 20a, 20b, to about half the extension of the chamber towards the slit. The rest of the surface 100 of the wall 18 is provided with a thin interior layer 21a of semi-conductive material.

Alternatively, also the rest of the wall 18 defining the chamber 16 may be homogenously constituted by a semi-conductive material.

Of course a part of or the rest of the exterior surface 102 of the wall 6, i.e. between the first and second ends 6a, 6b may be provided with a thin layer of semi-conductive material to increase the electrical contact surface. Alternatively, a part of or the whole wall 6 may be homogenously constituted by a semi-conductive material, i.e. from the first end 6a to the second end 6b.

Figure 3A:
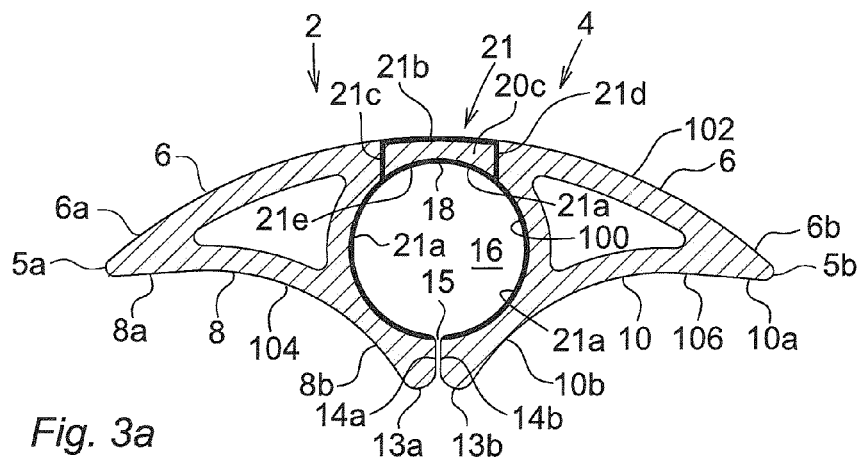
FIG. 3a is a cross-section of a power cable assembly body according to a second embodiment of the invention with an alternatively configured semi-conductive layer.

FIG. 3a shows a second embodiment of an assembly device 2 made by extrusion of a polymer material, such as PE (e.g. MDPE or HDPE) or PVC.

Also in this embodiment, the first wall 6 of the profiled body 4 is convex and has first and second ends 6a, 6b; the second wall 8 is concave and has first and second ends 8a, 8b; and the third wall 10 is concave and has first and second ends 10a, 10b. The first, second and third walls are connected to one another as described in connection with FIG. 1 above.

However, according to this embodiment, the second end 8b of the second wall 8 continues to a first curved transition 13a and further to a first radial transition 14a. Likewise, the second end 10b of the third wall 10 continues to a second curved transition 13b and further to a second radial transition 14b. Also in this embodiment the first and second radial transitions 14a, 14b are substantially parallel to one another and are thus substantially radial to the convex first wall 6.

However, according to this embodiment, the first and second radial transitions 14a, 14b are arranged without distance from one another, i.e. the slit 15 is closed at least when mounted, even though the slit for clarity reasons have been shown to be somewhat open.

Also in this embodiment, the annular wall 18 defining the chamber 16 extends from the first radial transition 14a to the second radial transition 14b. The annular chamber wall 18 has a peripheral portion 20c in common with the first wall 6.

According to this embodiment, the interior surface 100 of the annular wall 18 is provided with a thin interior layer 21a of a semi-conductive material 21. A portion of the thin layer 21a on the interior of the peripheral portion 20c in common with the first wall 6 is denoted 21e.

Furthermore, the exterior surface 102 of the peripheral portion 20c is provided with a thin exterior layer 21b of semi-conductive material 21. A connecting layer 21c or string of semi-conductive material 21 and a therefrom laterally separated fourth layer 21d or string of semi-conductive material 21 extends from the interior layer 21a to the exterior layer 21b through the first wall 6 at the portion 21e, hereby electrically interconnecting layer 21a and layer 21b.

Again, the thin layer 21a-21d of semi-conductive material 21 may be made of carbon black mixed into a polymer material (e.g. PE or PVC) before the co-extrusion process.

It should be noted that it would be possible to provide only a single thin layer 21c between the interior and exterior thin layers 21a and 21b. Alternatively, it would be possible to provide more than two laterally disposed thin layers, such as three four up to any number depending on the size of the portion 20c and the thickness of the thin connecting layer 21c, 21d etc.

Figure 3B:
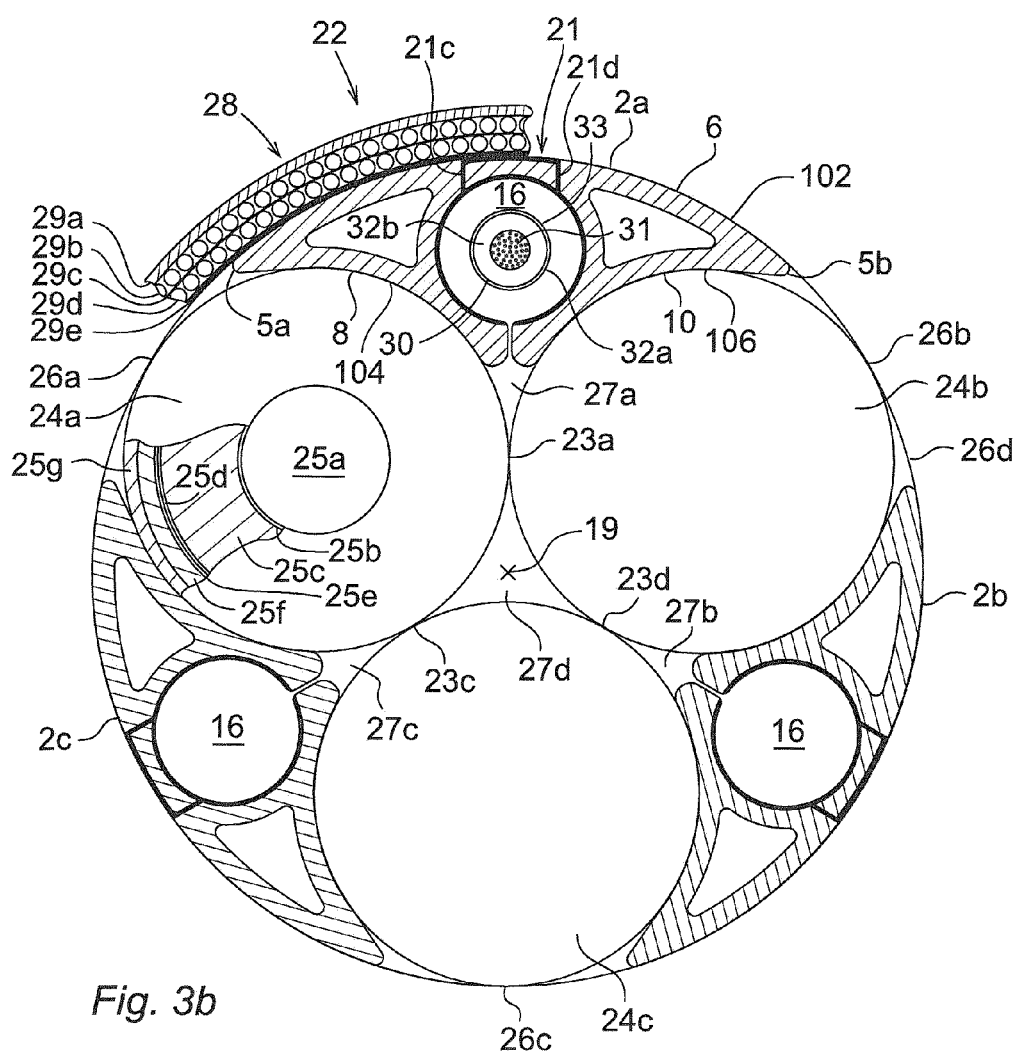

FIG. 3b shows the interior of a power cable 22 provided with three neighbouring first, second and third power cores 24a, 24b, 24c. They are built up in a manner corresponding to that of the embodiment of FIG. 1b, and are thus each provided with a peripheral semi-conductive mantle 25g touching one another.

Also in this case, first, second and third assembly devices 2a, 2b, 2c are arranged in the peripheral spaces between the first, second and third power cores 24a, 24b, 24c, respectively.

A fibre optic cable 30 is put inside the chamber 16 of assembly device 2a.

The thin interior layer 21a of semi-conductive material 21 of the thickness range presented above extends about the interior surface 100 of the annular wall 18. Thus, a contact of the thin layer 21a-21d of semi-conductive material 21 and the fibre optic cable 30 will be established, disregarding which part of the annular wall 18 is contacted by the fibre optic cable 30.

Owing to the fact that the thin layer 21a-21d of semi-conductive material 21 extends from the chamber 16 to the exterior surface 102 of the first wall 6, electric contact will be established with the steel armour layer 29d via the second soft layer 29e of semi-conductive laying bands, and thus also with the first layer 29c of semi-conductive laying bands and the first steel armour layer 29b.

Electric contact is also established between the power cores 24a, 24b, 24c via the peripheral semi-conductive mantle 25g of each power core at their peripheral points 26a-26c and the second layer 29e of semi-conductive laying bands and of course also the layers 29b-29d.

In this manner, and as already explained above in connection with FIGS. 1a and 1b, the risk for building up an electric potential between the fibre optic cable 30 and any one of the power cores 24a-24c or any other surrounding metallic parts, such as the armour layers 29b, 29d is avoided.

Again, this relates correspondingly to the case when a fibre optic cable is put inside the chamber of the assembly bodies 2b and/or 2c.

Figure 4:
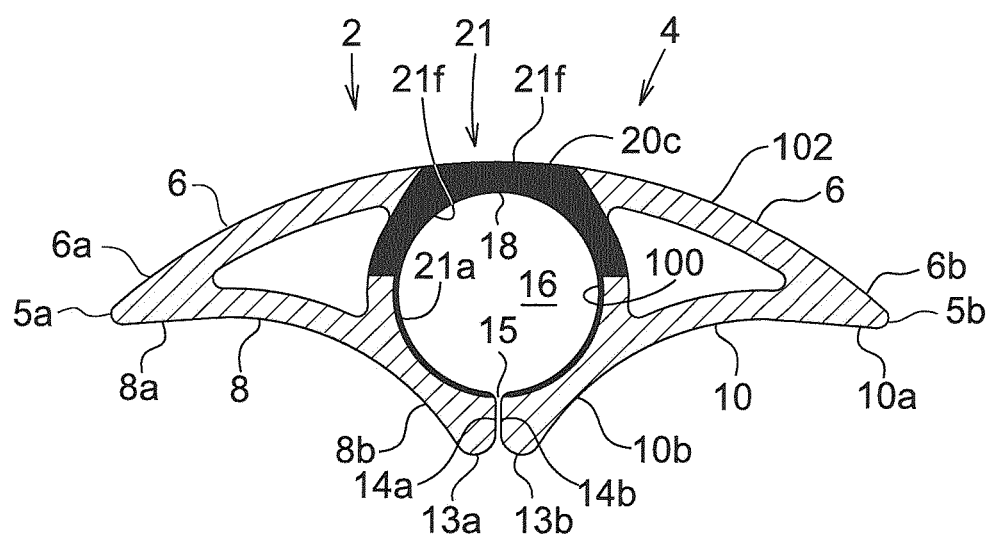
FIG. 4 is a cross-section of a variant of the power cable assembly device shown in FIG. 3a with an alternatively configured semi-conductive layer.

FIG. 4 shows a variant of the power cable assembly device 2, according to which the peripheral portion 20c of the first wall 6 and the chamber wall 18 is at least partly, but preferably homogenously constituted by a substantially homogenous wall 21f of semi-conductive material 21.

The substantially homogenous wall 21f extends further along the chamber wall 18 to a region a between the first wall 6 and the second wall 8 and third wall 10, respectively. The rest of the interior surface 100 of the wall 18 not fully constituted by a semi-conductive material is covered with or is constituted by a thin interior layer 21a of semi-conductive layer 21.

Figure 5A:
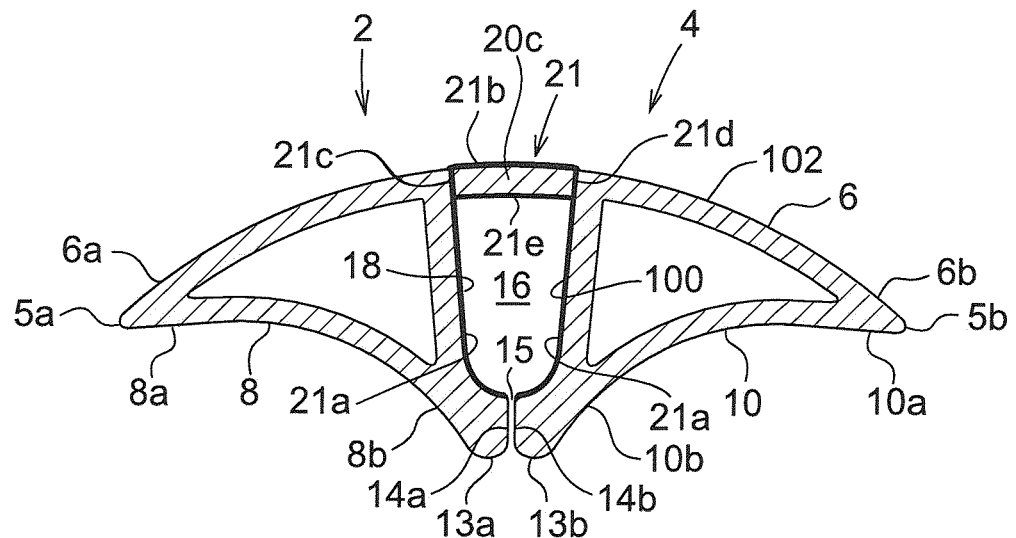

FIG. 5a shows a power cable assembly device of the same kind as shown in FIG. 3a, the wall 18 however defining an elongated chamber 16 in the radial direction of and starting from the peripheral portion 20c, and extending to the slit 15.

The interior surface 100 of the chamber wall 18—including the interior of the peripheral portion 20c—is provided with a thin interior layer 21a (and 21e) of semi-conductive material 21. The exterior surface 102 of the peripheral portion 20c is also provided with a thin exterior layer 21b of semi-conductive material 21. In order to electrically connect the interior and exterior layers 21a, 21b to one another, a part of the lateral extension of the peripheral portion 20c is provided with laterally separated third and fourth thin connecting layers 21c, 21d of semi-conductive material 21. As already discussed above, the semi-conductive material may be carbon black mixed into a polymer material (e.g. PE or PVC) before the co-extrusion process.

Figure 5B:
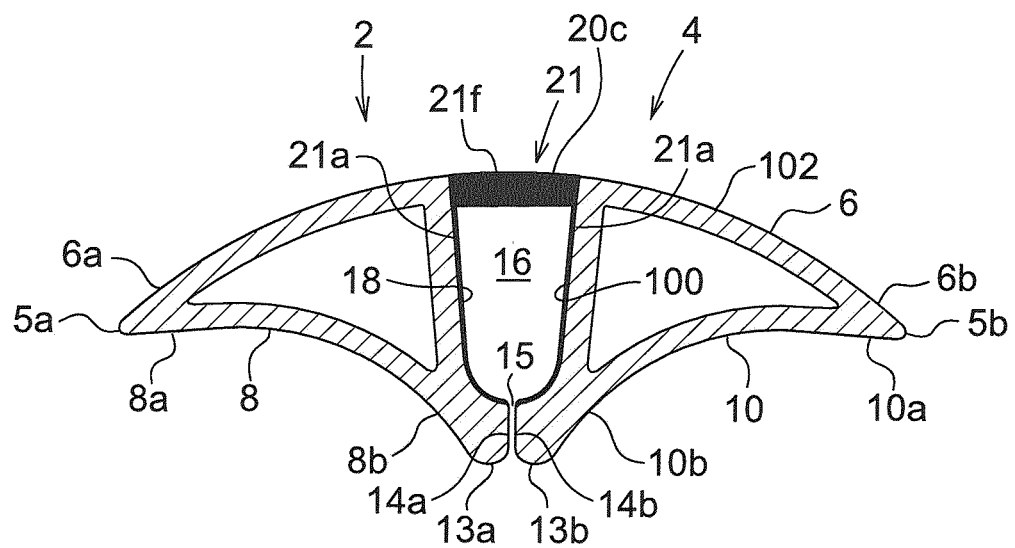

FIG. 5b shows an alternative to the power cable assembly device shown in FIG. 5a. The lateral extension of the peripheral portion 20c of the chamber wall 18 in common with the first wall 6 is at least partly constituted by a substantially homogenous wall 21f of semi-conductive material 21. The rest of the interior surface 100 of the wall 18 is covered with a thin interior layer 21a of semi-conductive material 21.

Figure 6:
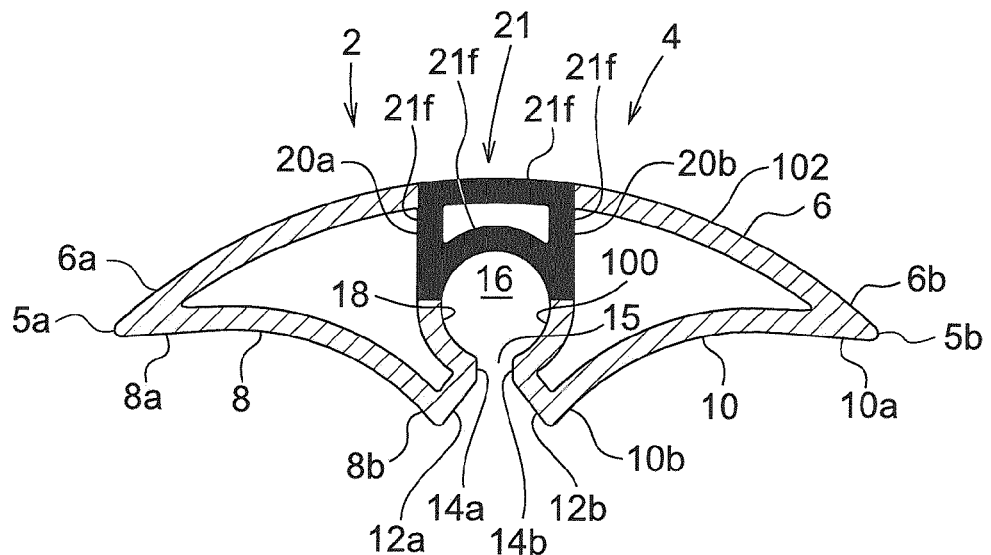
FIG. 6 illustrates a power cable assembly device of the kind shown in FIG. 1a, with an alternatively configured semi-conductive layer.
Figure 7:
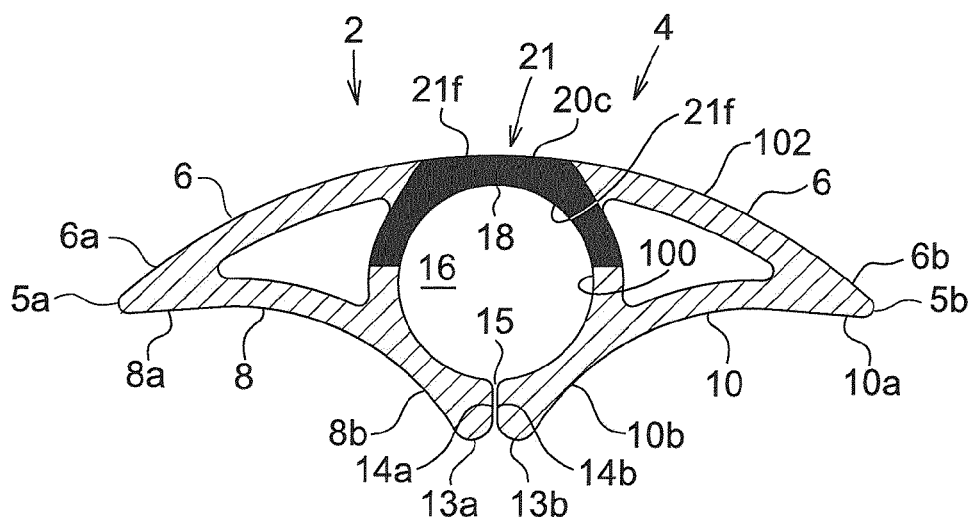
FIG. 7 illustrates a power cable assembly device of the kind shown in FIG. 3a, with an alternatively configured semi-conductive layer.

FIG. 6 shows a variant of the embodiments shown in FIGS. 1a and 2, while FIG. 7 shows a variant of the embodiments shown in FIGS. 3a and 4. As can be seen in FIGS. 6 and 7, only about half the cross-sectional annular extension of the chamber wall 18 is homogenously provided with a semi-conductive material 21. The rest of the annular surface 100 is not provided with a semi-conductive material 21, neither homogenously, nor in the form of a thin interior layer.

Figure 8:
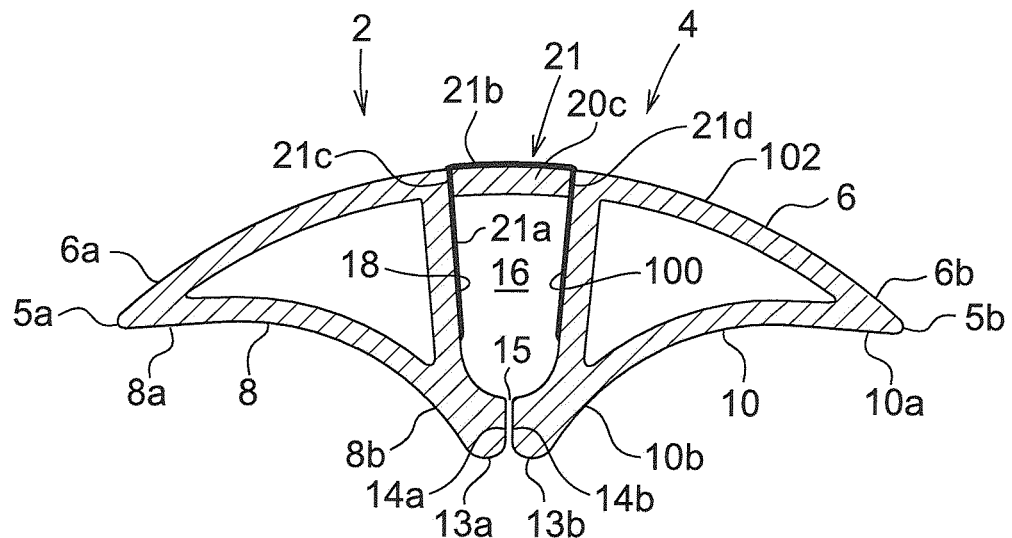
FIG. 8 illustrates a power cable assembly device of the kind shown in FIG. 5a, with an alternatively configured semi-conductive layer.

FIG. 8 shows a variant of the embodiment shown in FIG. 5a. Unlike the latter, the inner surface 100 of the peripheral portion 20c of the chamber wall 18, is not provided with a thin interior layer (cf. reference numeral 21e in FIG. 5a) of semi-conductive material 21. The same relates to a part of the chamber wall 18 closest to the slit 15.

Likewise, it would be possible also in the embodiment shown in FIGS. 3a-3b to omit the provision of a layer of semi-conductive material on the interior surface 100 of the peripheral portion 20c facing the chamber 16.

It would furthermore be possible in the embodiment shown in FIGS. 1a-1b to omit the provision of a layer of semi-conductive material on the part of the chamber wall 18 closest to the inner wall 6.

Figure 9:
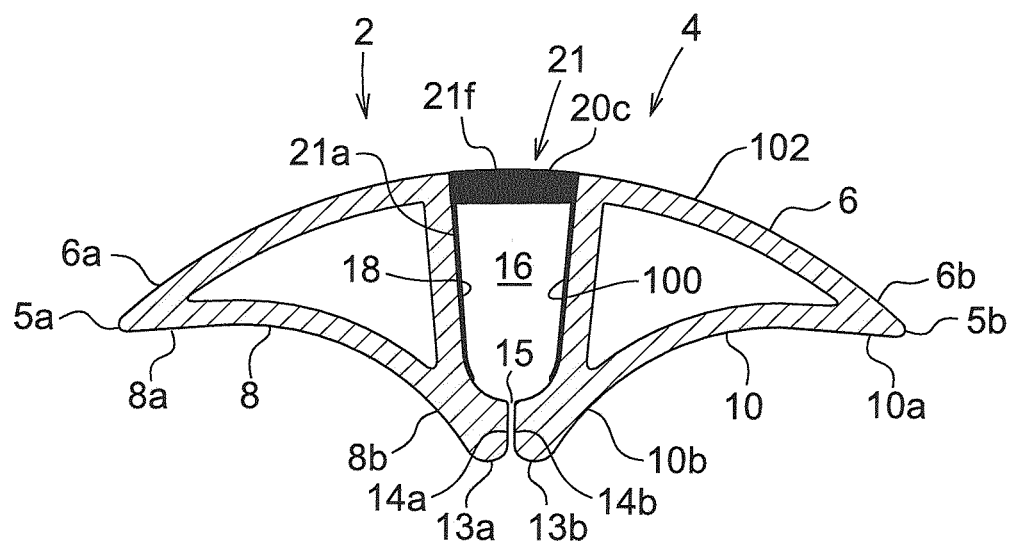
FIG. 9 illustrates a power cable assembly device of the kind shown in FIG. 5b, with an alternatively configured semi-conductive layer.

FIG. 9 shows a variant of the embodiment of FIG. 5b, according to which a part of the chamber wall 18 closest to the slit 15 is not provided with a thin interior layer of semi-conductive material.

Of course all embodiments described in FIGS. 1a-4 may be provided with a thin interior layer of semi-conductive material not extending about substantially the whole inner circumference of the chamber wall, as shown in FIGS. 6-9.

It should furthermore be understood that also a part of the chamber wall 18 shown in FIG. 5b may be homogenously made of a semi-conductive material, as shown in the embodiments of FIGS. 2, 4, 6 and 7.

It is to be understood that the power cable assembly device of FIGS. 1a, 2 and 6 may be provided with a slit 15 of the kind shown and described in connection with FIGS. 3a, 4, 5a and 5b, 7, 8 and 9.

Moreover, it is to be understood that the power cable assembly device of FIGS. 3a, 4, 5a and 5b, 7, 8 and 9 may be provided with a slit 15 of the kind shown and described in connection with FIGS. 1a and 2 and 6.

It should also be understood that parts of—or the whole exterior surface 102 of the first wall 6 of all embodiments described—may be provided with a thin exterior layer of semi-conductive layer 21.

It should also be understood that the power cable shown in FIGS. 1b and 3b may be provided with less armour layers 29b, 29d than two, i.e. one, or more than two, i.e. three or more, depending. Likewise, the power cable may be provided with less laying bands 29c, 29e than two, i.e. one, or more than two, i.e. three or more.

In all of the embodiments described above, the first, second and third walls 6, 8, 10 and the chamber wall have a thickness in the range 2-6 mm, more preferably 2.5-4 mm, most preferably 3 mm. The same relates to the reinforcement walls 20a, 20b of the embodiments shown in FIGS. 1a, 1b, 2 and 6.

It should be noted that the thickness of the first wall 6 may not be the same as the thickness of the second wall 8, the third wall 10 or the chamber wall 18, and in the embodiments of FIGS. 1a, 1b, 2 and 6, as the reinforcement walls 20a, 20b. This fact relates correspondingly to the thickness of the second wall 8, the third wall 10 and the chamber wall 18, and in the embodiments of FIGS. 1a, 1b, 2 and 6, to the reinforcement walls 20a, 20b.

The invention claimed is:
1. A power cable assembly device adapted to be arranged between neighbouring power cores of a power cable, comprising:
an extruded profiled body made of a polymer material and adapted to a cross-sectional shape of the power cable, said profiled body comprising a first wall, a second wall and a third wall, said first wall being convex and having first and second opposite end portions, the first wall having an exterior surface adapted to face a jacket of the power cable, said profiled body having a chamber wall extending from said second wall to said third wall, said chamber wall having an interior surface defining a chamber, said profiled body defining a slit between said second wall and said third wall to said chamber, said chamber being adapted to receive a fibre optic cable via said slit, wherein said second wall is concave and has third and fourth opposite end portions, said third wall being concave and having fifth and sixth end portions, the third end portion of said second wall being connected to said first end portion of said first wall, the fifth end portion of said third wall being connected to said second end portion of the first wall, said second and third walls being adapted to face a pair of neighbouring power cores, wherein the fourth end portion of the second wall and the sixth end portion of the third wall define together said slit to said chamber inside said profiled body, said slit for allowing introduction of a fibre optic cable into said chamber, at least a portion of said interior surface is provided with a semi-conductive material and at least a portion of said exterior surface is provided with a semi-conductive material, said interior surface and said exterior surface being electrically interconnected by said semi-conductive material, wherein electrical connection is obtained between the jacket and the body as well as between the body and a core.

2. The power cable assembly device according to claim 1, wherein:
at least a portion of the interior surface of the chamber is provided with an interior layer of said semi-conductive material,
at least a portion of the exterior surface of the first wall is provided with an exterior layer of said semi-conductive material, and
said interior and exterior layers being interconnected.

3. The power cable assembly device according to claim 2, wherein the interior layer and the exterior layer are interconnected via a connecting layer of semi-conductive material extending from the interior surface of the chamber to the exterior surface of the first wall at least via the chamber wall and the first wall.

4. The power cable assembly device according to claim 3, wherein said first wall and said chamber wall are interconnected via a reinforcement wall, and said connecting layer extending from the interior surface of the chamber wall to the exterior surface of said first wall via said reinforcement wall.

5. The power cable assembly device according to claim 3, wherein the thickness of said connecting layer is in the range 0.01-0.5 mm.

6. The power cable assembly device according to claim 2, wherein a thickness of at least one of said interior layer and said exterior layer is in the range 0.01-0.5 mm.

7. The power cable assembly device according to claim 1, wherein the chamber wall and the first wall define together a peripheral portion of the chamber.

8. The power cable assembly device according to claim 1, wherein the semi-conductive material extends substantially homogenously through the first wall between said exterior and interior surfaces.

9. The power cable assembly device according to claim 1, wherein a thickness of the first wall is in the range of 2-6 mm.

10. The power cable assembly device according to claim 1, wherein a thickness of the chamber wall is in the range of 2-6 mm.

11. The power cable assembly device according to claim 1, wherein a cross-sectional shape of the chamber is substantially annular.

12. The power cable assembly device according to claim 1, wherein a cross-sectional shape of the chamber is elongated in a radial direction with respect to a radius of curvature of the convex first wall.

13. The power cable assembly device according to claim 1, wherein the polymer material of the profiled body is selected from the group consisting of PVC, PE, and combinations thereof.

14. The power cable assembly device according to claim 1, wherein the semi-conductive material comprises a mixture of a polymer material and an additive.

15. The power cable assembly device according to claim 1, wherein a concavity of an outer surface of the second wall, and a concavity of an outer surface of the third wall are adapted to accommodate a number of power cores and their respective diameters.

16. The power cable assembly device according to claim 1, wherein the convexity of the outer surface of the first wall is adapted to match the curvature of an imaginary circle inscribed through a peripheral point of each power core, wherein each peripheral point is the farthest point within each corresponding power core from the diametrical centre point of the power cable.

17. A power cable, comprising:
a plurality of power cable assembly devices each comprising
an extruded profiled body made of a polymer material and adapted to a cross-sectional shape of the power cable, said profiled body comprising a first wall, a second wall and a third wall, said first wall being convex and having first and second opposite end portions, the first wall having an exterior surface adapted to face a jacket of the power cable, said profiled body having a chamber wall extending from said second wall to said third wall, said chamber wall having an interior defining a chamber, said profiled body defining a slit between said second wall and said third wall to said chamber, said chamber being adapted to receive a fiber optic cable via said slit, wherein said second wall is concave and has third and fourth opposite end portions,
said third wall being concave and having fifth and sixth end portions, the third end portion of said second wall being connected to said first end portion of said first wall, the fifth end portion of said third wall being connected to said second end portion of the first wall, said second and third walls being adapted to face a pair of neighbouring power cores,
the fourth end portion of the second wall and the sixth end portion of the third wall define together said slit to said chamber inside said profiled body, said slit allowing introduction of a fibre optic cable into said chamber,
at least a portion of said interior surface is provided with a semi-conductive material and at least a portion of said exterior surface is provided with a semi-conductive material, said interior surface and said exterior surface being electrically interconnected by said semi-conductive material, and
said plurality of power cable assembly devices being arranged in the spaces between two or more neighbouring power cores, and at least one of said plurality of power cable assembly devices containing a fibre optic cable introduced via said slit, wherein electrical connection is obtained between the jacket and the body as well as between the body and a core.

18. The power cable according to claim 17, wherein
the first wall faces a jacket of the power cable,
said second and third walls face a pair of neighbouring power cores, at least one of said assembly devices containing said fibre optic cable.

19. The power cable according to claim 18, wherein a concavity of an outer surface of the second wall and a concavity of an outer surface of the third wall are adapted to accommodate a number of power cores and their respective diameters.

20. The power cable according to claim 18, wherein the convexity of the outer surface of the first wall is adapted to match the curvature of an imaginary circle inscribed through a peripheral point of each power core farthest from the diametrical centre point of the power cable.

21. The power cable according to claim 17, wherein the number of power cores is three, the number of power cable assembly devices is three, and the diameter of each power core is in the range of 30-140 mm.

\* \* \* \* \*